June 2, 1964  F. D. MANGANELLI, JR  3,135,898
SEQUENCING CIRCUIT

Filed April 17, 1961  2 Sheets—Sheet 1

INVENTOR
FREDERICK D. MANGANELLI JR.
BY David S. Fishman
AGENT

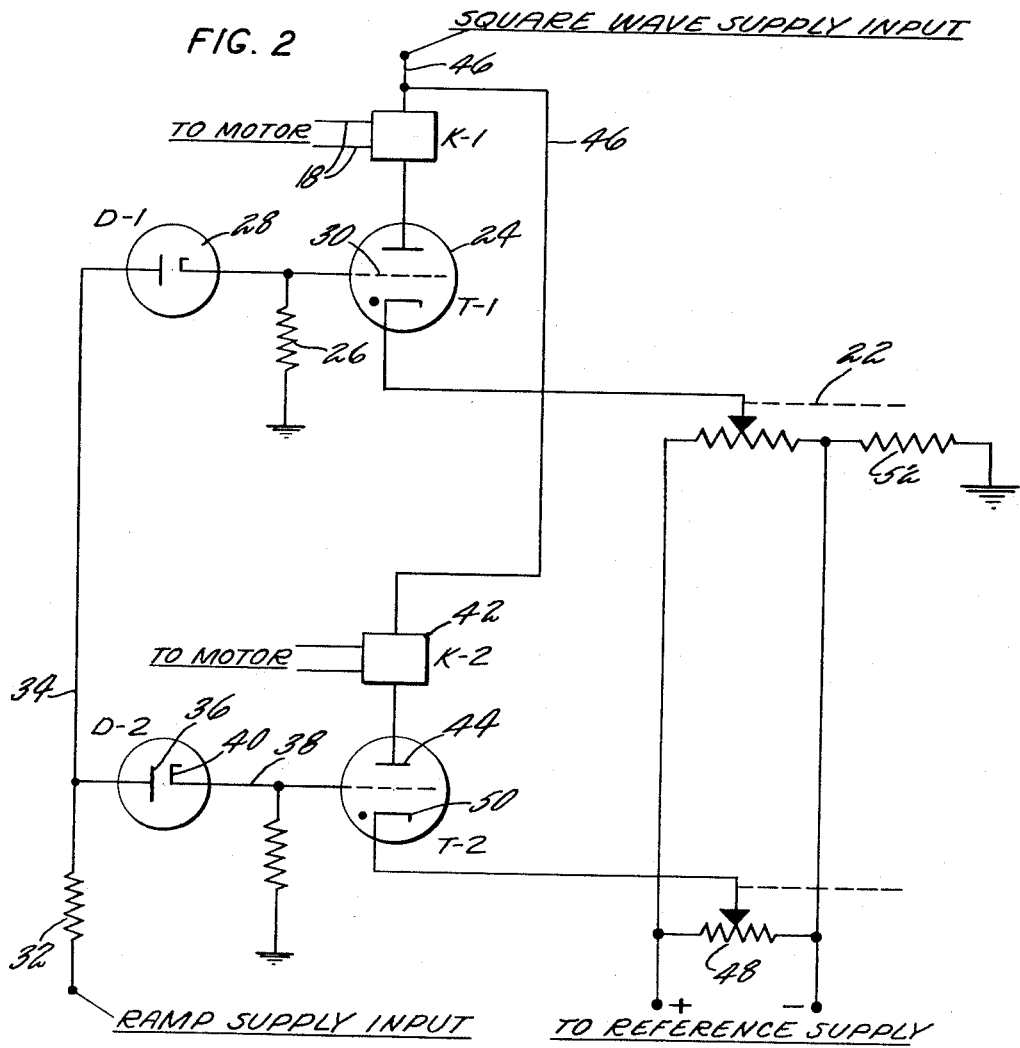

United States Patent Office 3,135,898
Patented June 2, 1964

3,135,898
SEQUENCING CIRCUIT
Frederick D. Manganelli, Jr., Wethersfield, Conn., assignor to United Aircraft Corporation, East Hartford, Conn., a corporation of Delaware
Filed Apr. 17, 1961, Ser. No. 103,655
16 Claims. (Cl. 317—149)

This invention relates to a sequencing device. More particularly it relates to an electronic circuit for selectively actuating a series of moveable elements to maintain a predetermined synchronized relationship between the moveable elements.

In many circumstances it is desired to use a plurality of cooperating individual elements to obtain a single result while retaining separate control over the individual elements. In this manner a much finer degree of control can be exercised in achieving the final result than is possible when the individual elements are controlled aggregately. Furthermore, when the individual elements are controlled in the aggregate any control error is multiplied by the number of elements, whereas when the elements are individually controlled any control error is confined to the particular element with which the control is associated. Also, when the elements are individually controlled and actuated, the effects of the failure of an actuator are limited to one element.

Although the present invention will be described as applied to the control of a nuclear reactor, it is to be expressly understood that it is not limited to such application but can be employed wherever it is desired to control a number of individual cooperating elements. For example, among its many possible applications the present invention could be employed to compare and equalize the liquid levels of a number of liquid containers, or it could be used to compare and equalize the temperatures in a number of ovens.

As applied to a nuclear reactor, the present invention is used to actuate and regulate the control drums. The control drums must be moved slowly and uniformly from the poison position to the reflecting position. To minimize errors in the angular speed of the drums and to maintain angular synchronization between the drums, it has been found desirable that the drums be individually actuated. Furthermore, it has been found desirable that at any one time only the drum which is most lagging in angular rotation be rotated toward the reflecting position for a predetermined period of time. In this manner errors in the desired angular speed of the drums can be minimized and a great degree of control over angular synchronization is achieved.

Accordingly, one feature of the present invention is an electronic circuit for maintaining synchronization between a number of moveable elements.

Another feature of the present invention is an electronic circuit for selectively actuating individual elements of a group of elements.

Still another feature of the present invention is an electronic circuit for sampling the relative conditions of a group of individual moveable elements and selectively actuating the most lagging element of the group.

Still another feature of the present invention is an electronic circuit for selectively actuating individual elements of a group of elements and preventing the actuation of the remaining elements of the group when one element is actuated.

Still another feature of the present invention is an electronic control for individually actuating a group of elements so that failure of an actuating element will be limited in effects to only one element.

Other features and advantages will be apparent from the specification and claims, and from the accompanying drawings which illustrate an embodiment of the invention.

FIG. 2 is a partial circuit diagram of the present invention showing the control circuit for 2 elements.

FIG. 3 is a diagram of a ramp voltage supply for the control circuit.

FIG. 4 is a diagram of a square wave voltage supply for the control circuit.

Figure 1:
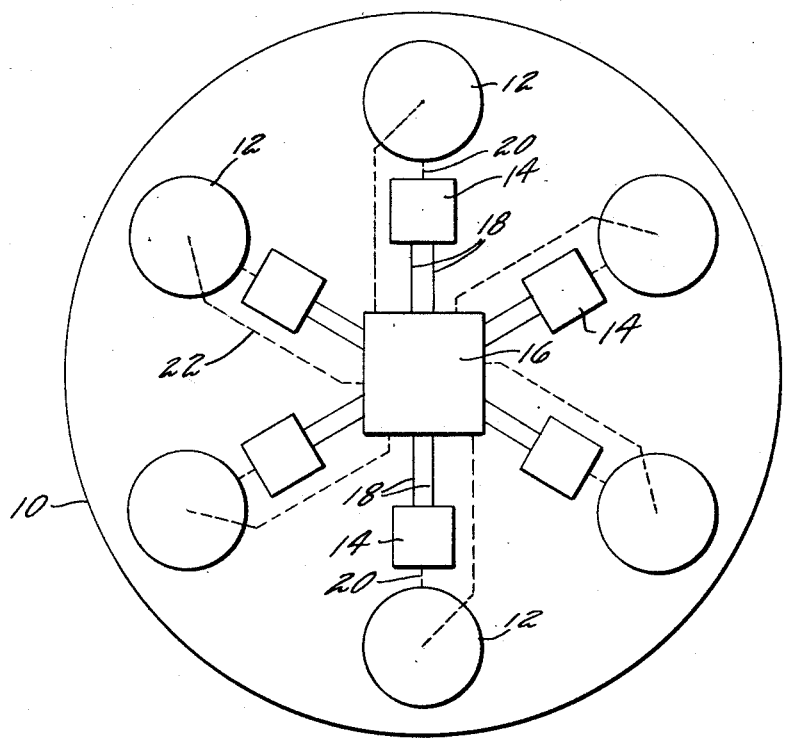
FIG. 1 is a view showing the invention applied to a nuclear reactor.

Referring to FIG. 1, nuclear reactor 10 contains a number of control drums 12. Part of the circumference of each drum 12 consists of a poison material and part of the circumference of each drum consists of a reflector material. Generally speaking, the drums are rotated so that the reflector portions face inward toward the center of the reactor and face each other when it is desired to operate the reactor, the power level of the reactor being determined by the degree of rotation of the drums. In order to achieve a sensitive control over the drums, it has been found desirable to actuate each drum independently. If the drums are driven by a common source any error in the speed of the source will be multiplied by the number of drums in the particular reactor, whereas individual actuation of the drums restricts any such error to the drum associated with the errant driving means. Furthermore, individual actuation of the drums provides a means for maintaining a fine control over the angular synchronization of the drums and the failure of any motor will only affect one drum. To these ends a motor 14 is associated with each drum.

The motors 14 are selectively actuated by control 16. Each motor 14 is electrically connected to electronic control 16 by wires 18, and each motor is in turn drivingly connected to a drum 12 by any well-known driving mechanism 20 which may for example consist of a rack and pinion or a gear train. The angular position of each drum is conveyed to control 16 by means of feedback linkage 22.

FIG. 2 is a partial circuit diagram of the electronic device for controlling drums 12. The electronic control consists of a plurality of thyratrons 24 equal to the number of drums 12 to be controlled. A resistance 26 and a diode 28 are connected to the grid 30 of each thyratron. A common resistance 32 is also connected to the grid 30 of each thyratron, the resistance of resistors 26 being very high with respect to resistor 32. The ramp wave voltage shown in FIG. 3 is impressed on the grid 30 of each thyratron through wire 34 connected to the anode 36 of each diode 28 and wire 38 connected to the cathode 40 of each diode 28.

A relay 42 is connected to the plate 44 of each thyratron and the square wave voltage shown in FIG. 4 is impressed on each plate 44 through wire 46 and the coil (not shown) of each relay 42.

A potentiometer 48 is connected to the cathode 50 of each thyratron, the potentiometers being supplied by a common D.C. reference voltage. A resistance 52 acts as a common cathode resistor, the resistance of resistor 52 being less than the resistance of either resistor 32 or resistors 26.

The position of the potentiometer arm and hence the cathode voltage of each thyratron is regulated by feedback link 22, the arm of any potentiometer being associated with only one drum 12 through a link 22. Similarly, any relay 42 is associated only with one motor 14 to drive one drum 12, the potentiometer and the relay connected to any one thyratron being associated with the same drum 12.

As can be seen, electronic control 16 consists of a group of units each of which is made up of a thyratron 24, a resistor 26, a diode 28, relay 42, and a potentiometer 48, resistors 32 and 52 being common to all the units. It should be apparent that the number of units will depend on the number of elements to be controlled, and only two units have been shown in FIG. 2 for purposes of simplicity.

In the operation of the control the square wave voltage shown in FIG. 4 is impressed on the plates 44 of the thyratrons so that the plate voltage of each thyratron is equal at any given time. The cathode voltage of any thyratron depends upon the position of the arm of the potentiometer associated with that particular thyratron, and the position of the arm is a direct function of the angular position of the drum 12 to which the potentiometer is connected by link 22. Thus it will be seen that the voltage level of the thyratron cathodes will differ and reflect the angular rotation of drums 12, the voltage level of any thyratron cathode increasing as its associated drum advances to the reflecting position. Therefore, the potential difference between the plate and cathode of the thyratron will be greatest in that thyratron which is associated with the drum which has been least rotated toward the full reflecting position, i.e., the drum which is most lagging with respect to the other drums.

The ramp wave voltage shown in FIG. 3 is impressed on the grid of each thyratron 24 so that the grid voltage of the thyratrons is equal at any given time. The ramp wave voltage shown in FIG. 3 and the square wave voltage shown in FIG. 4 are in phase. Bearing in mind that the potential of the cathode of each thyratron will differ, one of the thyratrons will start to conduct when the grid voltage reaches the critical point for the thyratron with the lowest cathode potential, this being the thyratron associated wtih the most lagging drum. Current will flow from the square wave supply through the relay coil, through the conducting thyratron and through a path including resistor 52 to ground thereby energizing the coil in its associated relay 42 to close the relay and actuate the associated motor 14 to advance the most lagging drum. Thus the thyratron or the thyratron and relay acts as a switching mechanism to actuate the motors. The time period of drum movement will be determined by the frequency of the square wave voltage impressed on the thyratron plate. Movement of the drum will, of course, reposition the associated potentiometer arm through link 22 and thus change the cathode voltage of the conducting thyratron. This process will be repeated for each cycle of the square wave and ramp wave inputs so that the drum which is most lagging at any one time will be advanced by the switching action of the thyratrons and relays.

It will be apparent that if one thyratron has started to conduct at a low value of grid voltage, it may be possible with the increasing ramp grid voltage that the critical grid voltage of another thyratron will be reached thereby causing that other thyratron to conduct also. Therefore, in accordance with the objects of the present invention, means are provided to prevent the remaining thyratrons from conducting when any one thyratron is conducting.

Common resistor 32 is one element which operates to prevent conduction in more than one thyratron at one time. Common resistor 32 combines with the several resistors 26 to in effect form voltage dividers in the grid circuit of each thyratron. Since the resistance of resistors 26 is very high in comparison with common resistor 32 there will be very little current flowing through the several circuits consisting of resistor 32, diode 28, and resistor 26 resulting from the ramp wave supply input when no thyratron is conducting. Therefore, there is a small voltage drop across resistor 32 and the grid voltage of each thyratron will be high. However, when any one thyratron starts to conduct, grid current will also flow through the associated potentiometer 48 and common cathode resistor 52 to ground. Common cathode resistor 52 is of smaller resistance than either resistor 32 or resistors 26, and hence the current through resistor 32 will increase significantly as soon as one thyratron begins to conduct. Thus the potential drop across resistor 32 will increase significantly thereby reducing the ramp voltage on all thyratron grids to prevent any other thyratron from conducting after one thyratron has started to conduct.

Diodes 28 also operate to prevent more than one thyratron from conducting at any one time. It is known that when a thyratron starts to conduct with an inductive element such as the coil of relay 42 connected in series with the thyratron, a positive transient occurs which increases the grid voltage of the thyratron. In the present invention diodes 28 are placed in the grid circuit of each thyratron to prevent this positive transient from being reflected to the grid of any nonconducting thyratron, thereby preventing the grid voltage of any nonconducting thyratron from being raised to the critical value at which the nonconducting thyratron would start to conduct.

Common cathode resistor 52 also operates to prevent the remaining thyratrons from conducting when one thyratron starts to conduct. When any one thyratron starts to conduct, the plate and grid currents of that thyratron will pass through resistor 52 thereby raising the potential of the ungrounded side of resistor 52. This increased potential at the ungrounded side of common cathode resistor 52 is reflected to the cathode of each thyratron to raise the cathode voltage of each thyratron, thereby preventing the remaining thyratrons from conducting when one thyratron starts to conduct.

By way of example of the operation of the present invention, assume that the control drum 12 associated with the unit including the thyratron labeled T-1 is lagging all other drums in angular rotation. The cathode potential of thyratron T-1 will therefore be lower than the cathode potential of any other thyratron. At time $t_0$ the square wave voltage input will be impressed on the plate of each thyratron and the ramp wave voltage will simultaneously be impressed on the grid of each thyratron. At a time greater than $t_0$ but less than $t_1$ the grid voltage of thyratron T-1 will reach the critical value whereas the critical grid voltages of the remaining thyratrons will not have been reached. Thyratron T-1 will start to conduct and current will pass through the coil of relay K-1 to close the relay and energize the motor associated with relay K-1 to rotate the most lagging drum 12.

Prior to the time that the critical grid voltage of thyratron T-1 was attained, only a small current passed through resistor 32 and the diodes 28 and resistors 26 because of the relatively large resistance of resistors 26 as compared to resistor 32. However, when thyratron T-1 starts to conduct, a low resistance current path is then provided from the grid to the cathode of thyratron T-1 and thence through the associated potentiometer 48 and through resistor 52 to ground. Since resistor 52 is considerably smaller than resistors 26, the current passing through resistor 32 and diode D-1 will be increased significantly. This increased current level will result in a large potential drop across resistor 32 thus lowering the grid voltage of all the thyratrons so that the grid voltage of the thyratron labeled T-2 and all other nonconducting thyratrons will not reach the critical value at which they would start to conduct.

As has also been observed above, when thyratron T-1 starts to conduct, a positive transient will occur which will raise the grid voltage of the thyraton. Therefore, diode D-1 is inserted in the grid circuit of thyraron T-1 to prevent this positive transient from raising the grid voltage of thyratron T-2 and the other thyratrons in the control.

Common cathode resistor 52 also contributes to inhibit conduction in thyratron T-2 or any other thyratron in the control when thyratron T-1 starts to conduct. This is so because the grid and plate currents of thyratron T-1 pass through resistor 52 to ground thereby raising the cathode voltage of thyratron T-2 and all other thyratrons in the control to prevent these remaining thyratrons from conducting while thyratron T-1 is conducting.

After a predetermined time has elapsed, the grid voltage and the plate voltage of thyratron T-1 will simultaneously drop to zero and thyratron T-2 will cease to conduct. At time $t_1$ the plate voltage of all thyratrons will again be increased in accordance with the square wave input and the grid voltage of all thyratrons will start to increase in accordance with the ramp wave input. The arm of the potentiometer associated with thyratron T-1 will have been reset in accordance with the rotation of the drum associated with thyratron T-1 so that at the time $t_1$ the cathode voltage of thyratron T-2 or any one of the thyratrons in the system, including thyratron T-1, will now be lower than the cathode voltage of the other thyratrons. The above-described sequence will then be repeated with regard to whichever thyratron cathode is now at the lowest voltage.

It is to be understood that the invention is not limited to the specific embodiment herein illustrated and described but may be used in other ways without departure from its spirit as defined by the following claims.

I claim:

1. In an electronic device, a plurality of thyratrons, means for impressing an equal voltage on the plate of each of said thyratrons, means for impressing voltages on the cathodes of said thyratrons, the cathode voltage of at least one of said thyratrons being less than the cathode voltage of the other thyratrons, means for impressing an equal voltage on the grid of each of said thyratrons to cause the thyratron of lowest cathode voltage to conduct, and means for preventing the remaining thyratrons from conducting when one of the thyratrons is conducting.

2. An electronic device as in claim 1 wherein the preventing means includes diode means connected to the grid of each of said thyratrons.

3. An electronic device as in claim 1 wherein the preventing means includes resistance means connected in series with the cathodes of said thyratrons.

4. An electronic device as in claim 1 wherein the preventing means includes a resistance means in the cathode circuit of each of said thyratrons to raise the cathode voltages of said thyratrons when one of said thyratrons is conducting.

5. An electronic device as in claim 1 wherein the means for impressing the grid voltage includes a voltage divider and a diode in the grid circuit of each of said thyratrons.

6. In an electronic device, a plurality of thyratrons, means for impressing an equal voltage on the plate of each of said thyratrons, means including potentiometers in the cathode circuit of each of said thyratrons to impress voltages on the cathodes, means for impressing an equal voltage on the grid of each of said thyratrons to cause the thyratron of lowest cathode voltage to conduct, and means for preventing the remaining thyratrons from conducting when one of said thyratrons is conducting.

7. An electronic device as in claim 6 wherein the plate voltage impressing means includes a square wave generating means and the grid voltage impressing means includes ramp wave generating means.

8. An electronic device as in claim 7 wherein the plate and grid voltages are in phase.

9. In an electronic device, a plurality of thyratrons, a relay connected to each thyratron, square wave generating means for impressing an equal voltage on the plate of each of said thyratrons, potentiometers in the cathode circuit of each of said thyratrons to impress voltages on the cathodes, ramp wave generating means for impressing an equal voltage on the grid of each of said thyratrons to cause the thyratron of lowest cathode voltage to conduct and actuate the relay connected to said last-mentioned thyratron, moveable means positioned in response to the actuation of said last-mentioned relay, and means associated with said moveable means for adjusting the potentiometer in the cathode circuit of said last-mentioned thyratron in accordance with the position of said moveable means.

10. An electronic device as in claim 9 including a diode in the grid circuit of each of said thyratrons to prevent positive transients in the conducting thyratron from raising the grid voltage of the remaining thyratrons.

11. An electronic device as in claim 9 including voltage divider means in the grid circiut of each of said thyratrons to reduce the grid voltage of said thyratrons when said thyratron of lowest cathode voltage is conducting.

12. An electronic device as in claim 9 including resistor means in the cathode circuit of each of said thyratrons to increase the cathode voltages of said thyratrons when said thyratron of lowest cathode voltage is conducting.

13. In an electronic device, a plurality of switching means each having a cathode, an anode and a control electrode, means for impressing an equal voltage on the anode of each of said switching means, means for impressing voltages on the cathodes of said switching means, the cathode voltage of at least one of said switching means being less than the cathode voltage of the other switching means, means for impressing an equal voltage on the control electrode of each of said switching means to cause the switching means of lowest cathode voltage to be actuated, and means for preventing the actuation of the remaining switching means when one of said switching means is actuated.

14. An electronic device as in claim 13 wherein the preventing means includes resistance means connected to the control electrodes of said switching means.

15. An electronic device as in claim 13 wherein the preventing means includes diode means connected to the control electrode of each of said switching means.

16. An electronic device as in claim 13 wherein the preventing means includes resistance means connected to the cathode of said switching means and resistance means connected to the control electrodes of said switching means.

References Cited in the file of this patent

UNITED STATES PATENTS

| | | |
|---|---|---|
| 2,315,958 | Hill et al. | Apr. 6, 1943 |
| 3,030,554 | Leeson | Apr. 17, 1962 |